United States Patent
Tsuchida et al.

(10) Patent No.: US 6,232,017 B1
(45) Date of Patent: *May 15, 2001

(54) GRID FOR LEAD ACID BATTERY

(75) Inventors: Kensaku Tsuchida, Chigasaki; Hiroshi Imai, Kosai, both of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/922,375

(22) Filed: Sep. 3, 1997

(30) Foreign Application Priority Data

Dec. 26, 1996 (JP) .................................................. 8-347280

(51) Int. Cl.$^7$ .............................. H01M 4/73; H01M 4/14
(52) U.S. Cl. ........................ 429/234; 429/211; 429/235; 429/241; 429/245
(58) Field of Search ................................ 429/233, 234, 429/235, 245, 211, 241, 237; 29/2

(56) References Cited

U.S. PATENT DOCUMENTS

| | | | |
|---|---|---|---|
| 1,214,210 | * | 1/1917 | Mills . |
| 1,228,250 | * | 5/1917 | Skinner ................................ 429/241 |
| 2,754,348 | * | 7/1956 | Berchielli ............................. 429/211 |
| 2,834,825 | * | 5/1958 | Wenzelberger ................... 429/234 X |
| 3,556,855 | * | 1/1971 | Howells ........................... 429/235 X |
| 3,738,871 | * | 6/1973 | Scholle ............................. 429/211 X |
| 3,923,545 | * | 12/1975 | Margulies et al. .................... 429/241 |
| 4,160,309 | | 7/1979 | Scholle . |
| 4,464,446 | * | 8/1984 | Berger et al. ..................... 429/235 X |
| 4,476,206 | * | 10/1984 | Viala et al. ............................ 429/234 |
| 4,487,792 | * | 12/1984 | Hartmann .......................... 429/234 X |
| 5,139,902 | * | 8/1992 | Drews et al. ......................... 429/234 |
| 5,667,915 | * | 9/1997 | Loustau et al. ....................... 429/211 |

FOREIGN PATENT DOCUMENTS

| | | |
|---|---|---|
| 0076626 | 4/1983 | (EP) . |
| 2352407 | 12/1977 | (FR) . |

OTHER PUBLICATIONS

Patent Abstracts of Japan vol. 005, No. 086 (E–060), Jun. 5, 1981 and JP 56 032678 A (Shin Kobe Electric Mach Co. Ltd), Apr. 2, 1981.

Viala, et al. "Negative Composite Grids For Lead–Acid Accumulators", Journal of Applied Electrochemistry, May 1985, UK, vol. 15, NR. 3, pp. 421–429, ISSN 0021–891X XP002080502.

Viala, et al. "Mechanical Properties And Corrosion Behavior Of Lead–Silicon Carbide Fiber And Lead–Carbide Fiber Composites Made By Electrodeposition", Materials Chemistry and Physics, Nov. 1985, vol. 13, No. 5, pp. 393–408, XP002080501.

Patent Abstracts of Japan vol. 005, No. 015 (E–043), Jan. 29, 1981 and JP 55 144662 A (Shin Kobe Electric Mach Co. Ltd.), Nov. 11, 1980.

European Search Report dated Nov. 4, 1998.

* cited by examiner

*Primary Examiner*—John S. Maples
(74) *Attorney, Agent, or Firm*—Stevens, Davis, Miller & Mosher, LLP

(57) ABSTRACT

An electrode grid for use in a lead acid battery comprising a reticulate part made of an organic or inorganic compound and not having a lead coating applied thereto, and an electricity leading part made of lead of a lead alloy and provided on the reticulate part. This structure reduces the weight of the electrode and increases energy density per weight of the lead acid battery.

5 Claims, 2 Drawing Sheets

GRID FOR LEAD ACID BATTERY

BACKGROUND OF THE INVENTION

1. Field of the Invention

The present invention relates to a lead acid battery, and more particularly to a grid constituting electrodes of the lead acid battery.

2. Description of the Related Art

Because of, e.g., excellent stability in charging and discharging, lead acid batteries have been long used from the first commercialization, and a large number of the lead acid batteries are used. As compared with other system of storage batteries, however, the lead acid batteries have two main disadvantages that the energy density per weight is low and hence the weight of the battery itself has to be large. For this reason, although demand for lead acid batteries has increased as one type of portable power supplies in the recent trend toward cordless devices, there is a desire for lead acid batteries having more lighter weight, higher power and longer life than other battery systems. Conventional sealed lead acid batteries generally have the energy density per weight of about 34–35 WH/kg. However, a kind of lead acid battery having higher energy density of about 40–45 WH/kg is required for applications to an electric vehicle (EV), portable power supplies, etc.

In general lead acid batteries, an electrode plate is formed by coating lead oxide as a positive active material or lead as a negative active material on a grid made of lead or a lead alloy. The positive and negative electrode plates thus formed are positioned to face each other through a separator formed of glass fibers as a primary component, thereby fabricating a group of electrodes. The lead acid battery is then constructed by placing the group of electrodes in a container made of synthetic resin that is highly resistant against acid and shocks, and pouring dilute sulfuric acid as an electrolyte in the container.

Conventional grids for lead acid batteries have been manufactured by the casting method, the expanding method, the pressing method, etc. In any of these methods, other materials than lead or lead alloys have not been used as grid materials.

Of parts making up a lead acid battery, the part which can most effectively contribute to reducing the total weight of the lead acid battery without reducing the functions specific to that part is a grid. The grid of the lead acid battery is required to have three types of functions; (1) electrifying functions in charging and electricity collecting functions in discharging as electric conductors of the active materials in the processes of charging and discharging, (2) supporting functions of the grid itself and the active material, and (3) function of resisting corrosion ascribed to oxidizing and deoxidizing reactions occurred within the battery.

However, it has been very difficult for materials and structure of the grid to satisfactorily achieve the above functions of resisting vigorous oxidizing and deoxidizing reactions occurred within the battery, of enduring expansion and contraction of the electrode plates, and so on.

SUMMARY OF THE INVENTION

With the view of solving the above-stated problems in the related art, an object of the present invention is to provide a grid for a lead acid battery which can reduce the total weight of the lead acid battery without deteriorating its own functions.

To achieve the above object, according to the present invention, an electrode grid for a lead acid battery comprises a reticulate part made of an organic or inorganic compound, and an electricity collecting (or leading) part made of lead or a lead alloy and provided on the reticulate part, the electricity collecting part being formed on a mesh sheet. A reduction in weight can be achieved particularly in the negative electrode. This is because the negative electrode employs lead as active material and lead has electric conductivity in itself. Accordingly, the thickness of an electrically conductive part or thin film can be minimized. Also, because a negative electrode plate is less subject to corrosive reactions than a positive electrode, the electricity collecting part can be greatly cut down in comparison with conventional ones.

While a grid material may be in the form of a two- or three-dimensional reticulate sheet made of an organic or inorganic compound, a two-dimensional reticulate sheet formed of glass fibers is used in an embodiment described below. Electric conductivity can be given to the grid by forming a thin film of a lead alloy on the surface of the glass fiber sheet by vapour coating, fusion melt coating, or any other suitable process.

Thus, by employing a lead alloy in a minimum amount necessary to provide satisfactory electric conductivity and utilizing a light-weight material other than the lead alloy to provide a satisfactory ability of supporting the grid as a rigid structure, it is possible to reduce the total weight of the lead acid battery and increase the energy density per weight while maintaining the ability of the grid used as an electrode plate.

DESCRIPTION OF THE PREFERRED EMBODIMENT

Figure 1:
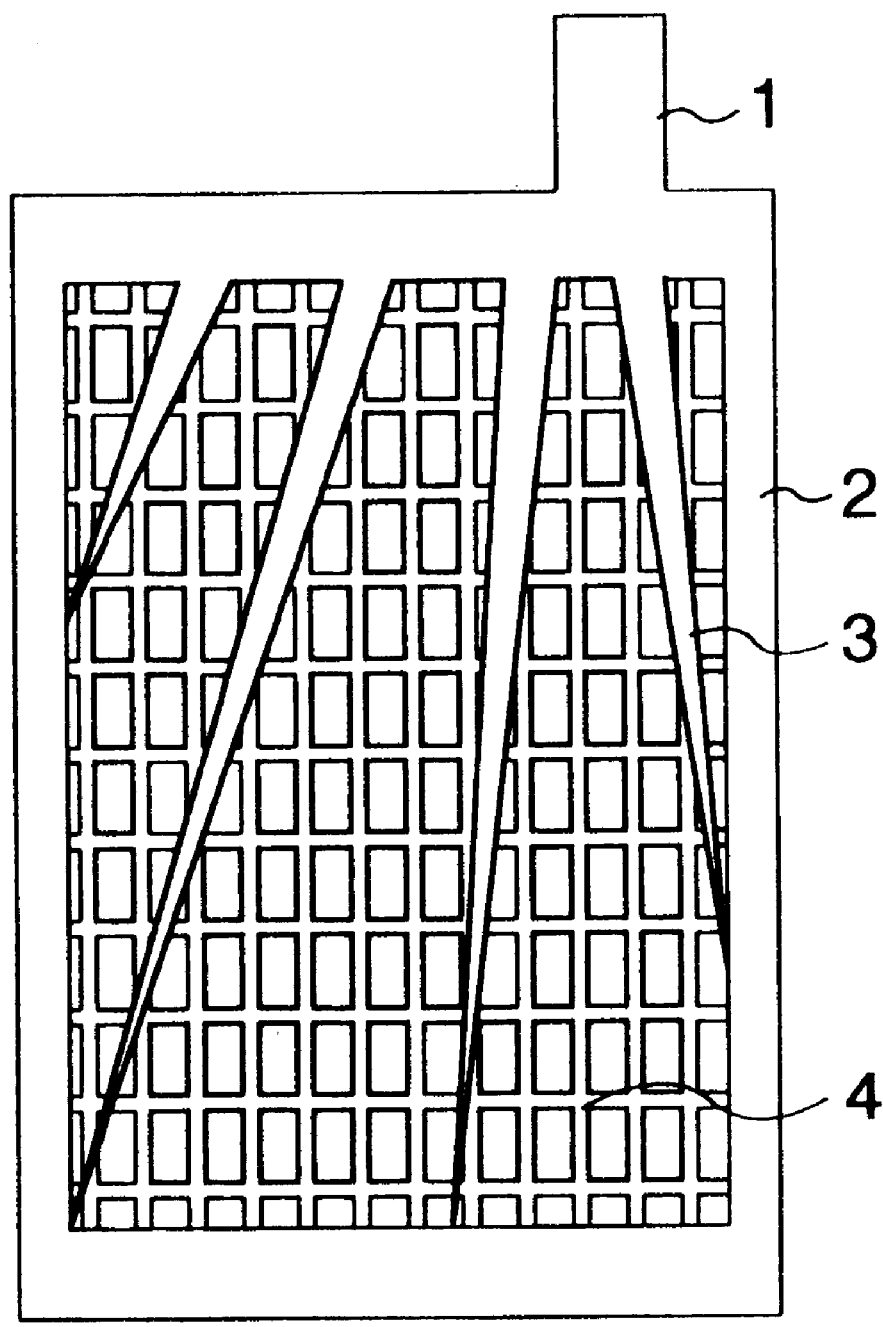
FIG. 1 is a front view of a composite cast grid according to one embodiment of the present invention.
Figure 2:
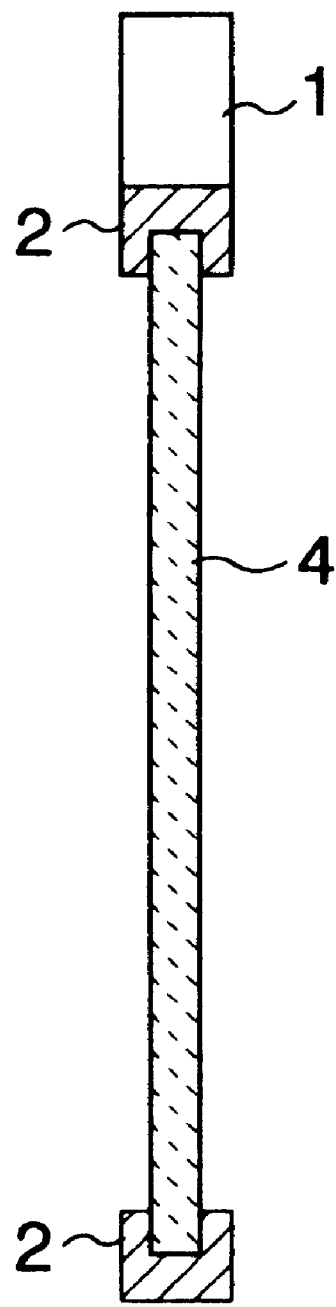
FIG. 2 is a sectional view of a composite cast grid according to the embodiment of the present invention.

FIG. 1 is a front view of an electrode plate grid according to one embodiment of the present invention, and FIG. 2 is a side sectional view of the same electrode plate grid. Referring to FIG. 1, denoted by reference numeral 1 is a lead portion made of a lead alloy, which is electrically communicated with a frame 2 and electricity collecting parts 3, for receiving and sending electrons from and to the whole of an electrode plate therethrough. The frame 2 and the electricity collecting parts 3 are both made of a lead alloy and formed by simultaneous casting with glass fiber sheets 4. As seen in FIG. 1, the electricity collecting parts 3 have cross-sectional areas which increase in a direction approaching the lead portion 1.

The embodiment of the present invention will be described in connection with the case of fabricating the grid by an ordinary casting machine. The ordinary casting machine has a pair of mating molds in the surface of each of which grooves corresponding to the shape of the electrode plate are defined. A molten lead alloy is then poured into cavities of the molds so that the grooves corresponding to the shape of the electrode plate are completely filled with the molten lead alloy. After the molten lead alloy has cooled, the electrode plate is taken out of the molds and then trimmed into a finished cast grid. In practice, a mixture liquid of cork chips (about 10 $\mu$m) and a binder is sprayed onto the mold surface so as to serve as not only a release material but also a heat insulating material. A coat of the sprayed liquid delays the molten lead alloy in start of cooling, ensuring that the molten lead alloy substantially starts cooling after it has filled into all the corners of the grooves. Usually, the temperature of the molten lead alloy is about 500° C. and the temperature of the molds is about 250° C. The cork is coated in a thickness of 0.1–0.3 mm so that the molten lead alloy keeps the temperature momentarily at the initial temperature and then cools down sufficiently during a casting cycle of 5 sec. The cork is also effective to compensate for distortions and gaps caused by thermal deformations of the molds. In other words, in the state where the molds are closed, a cushion is provided between the molds in a thickness corresponding to that of the cork, and the grid in this embodiment is cast by utilizing the cork cushion.

One example of molding the grid will be described below. Grooves for forming the frame, the electricity collecting parts and the lead portion are machined in the surface of each mold. A thin glass fiber sheet (0.1–0.3 mm) in the form of a grid having the same dimensions (length and width) as those of the electrode plate is placed on the surface of the cork cushion, i.e., between the molds. The molds are then closed with the glass fiber sheet held between the cork surfaces. In this condition, a molten lead alloy is poured into the mold cavities for simultaneously molding the electricity collecting parts, the frame and the glass fiber sheet into a one-piece body corresponding to the shape of the grooves defined in the mold surfaces. After cooling, a composite cast grid made up of the lead alloy and the glass fiber sheet is taken out of the molds and then trimmed. Thus, a light-weight composite cast grid is completed. The composite grid molded as described above has a weight 30–40% less than conventional grids because the amount of the lead alloy is reduced corresponding to the glass fiber sheet embedded in the grid. The glass fiber sheet is usually positioned at the center of the mated molds in the direction of thickness of the light-weight composite grid. However, the position of the glass fiber sheet can be optionally set depending on the mold design. For example, if the surface of one mold is made substantially flat, the glass fiber sheet is positioned to be exposed to one surface of the composite grid and the thickness of the electricity collecting parts, the frame, etc. can be substantially reduced by half in comparison with the grid fabricated according to the above example.

In a subsequent step, a positive or negative active material is pasted over the composite cast grid to provide a pasted electrode plate. In this step, if grid mesh openings of the glass fiber sheet have a size of approximately 3–6 mm square, a paste of the positive or negative active material can be coated with the pasting process for completing a light-weight pasted electrode plate.

As an alternative example, a sheet formed by coating a thin film of lead or a lead alloy over a glass fiber sheet by vapor coating, laminate coating or the like can also be easily covered with a positive or negative active material through the pasting process in a like manner to the above example, thereby completing a light-weight pasted electrode plate. Further, the material cost of the glass fiber sheet is inexpensive, and therefore a great merit can be resulted from the economical point of view as well by manufacturing a number of composite cast grids through continuous casting in the actual production facility.

As fully described above, according to the present invention, since light-weight composite grids can be used as grids for lead acid batteries, the weight of the lead acid battery is reduced and energy density per weight is increased. The material cost is also reduced. Consequently, a great economical value from the industrial point of view can be achieved with those advantages of the invention.

What is claimed is:

1. A composite grid for a lead acid battery, the composite grid comprising:

a reticulate part made of an organic or inorganic compound, said reticulate part not being made of lead nor having a lead coating applied thereto over its entire surface; and an electricity leading part made of lead or a lead alloy, said electricity leading part comprising at least one leading portion, a frame, and electricity collecting parts, wherein said leading portion is provided on a first side of said frame, and each of said electricity collecting parts has a cross-sectional area which increases in area from a second side of said frame on which said leading portion is not provided, or from either of opposing lateral sides of said frame, toward said first side, said increase in area being a continuous increase across each of said electricity collecting parts, and said electricity collecting parts cover only a portion of said reticulate part.

2. A composite grid for a lead acid battery according to claim 1, wherein said organic or inorganic compound is fibrous.

3. A composite grid for a lead acid battery according to claim 2, wherein said fibrous compound is organic and comprises polyamide fibers.

4. A composite grid for a lead acid battery according to claim 2, wherein said fibrous compound is inorganic and is selected from the group consisting of glass fibers and silicon carbide fibers.

5. A composite grid for a lead acid battery according to claim 1, wherein said reticulate part made of an organic or inorganic compound and said electricity leading part made of lead or a lead alloy are formed into one piece by simultaneous molding.

* * * * *